(12) United States Patent
Nakajima

(10) Patent No.: US 7,639,920 B2
(45) Date of Patent: Dec. 29, 2009

(54) RECORDER

(75) Inventor: Hirofumi Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1122 days.

(21) Appl. No.: 10/442,245

(22) Filed: May 20, 2003

(65) Prior Publication Data

US 2003/0228133 A1 Dec. 11, 2003

(30) Foreign Application Priority Data

Jun. 10, 2002 (JP) ............................. 2002-168070

(51) Int. Cl.
*H04N 5/93* (2006.01)
(52) U.S. Cl. .................. 386/52; 386/117; 386/124; 386/121; 386/90
(58) Field of Classification Search ................ 386/117, 386/124, 52, 121, 90
See application file for complete search history.

(56) References Cited

U.S. PATENT DOCUMENTS

| 5,485,611 | A * | 1/1996 | Astle ............................... 707/1 |
| 5,937,136 | A * | 8/1999 | Sato ............................. 386/52 |
| 6,744,968 | B1 * | 6/2004 | Imai et al. ..................... 386/52 |
| 2004/0218902 | A1 * | 11/2004 | Yanagita ....................... 386/52 |
| 2008/0031586 | A1 * | 2/2008 | Itoh et al. ..................... 386/46 |

FOREIGN PATENT DOCUMENTS

| JP | 2001-069456 | 3/2001 |
| JP | 2001-197447 | 7/2001 |

* cited by examiner

*Primary Examiner*—Thai Tran
*Assistant Examiner*—Helen Shibru
(74) *Attorney, Agent, or Firm*—Cowan, Liebowitz & Latman, P.C.

(57) ABSTRACT

A recording apparatus which executes an effect process on a moving image signal and records it on a recording medium. The recording apparatus produces a representative image signal of the moving image signal recorded in the recording medium by using a portion of the moving image signal not subjected to the effect process.

10 Claims, 5 Drawing Sheets

IN CASE THAT PHOTOGRAPHED IMAGE TO BE RECORDED HAS BEEN SUBJECTED TO EFFECT PROCESSING, ORIGINAL IMAGE OF FIRST FRAME IS SUBJECTED TO COMPRESSION PROCESSING TO GENERATE THUMBNAIL IMAGE.

ORIGINAL IMAGE NOT SUBJECTED TO EFFECT PROCESSING IS SUBJECTED TO THINNING-OUT REDUCTION PROCESSING TO GENERATE MOVING IMAGE THUMBNAIL.

RECORDER

BACKGROUND OF THE INVENTION

1. Field of the Invention

The present invention relates to a recorder, and more particularly to an apparatus for recording moving image data along with thumbnail images.

2. Related Background Art

As an apparatus for recording and reproducing moving images, a video tape recorder (VTR) is known which records analog image signals on a magnetic tape. In addition to such an apparatus for recording and reproducing analog image signals, a digital VTR and a digital recorder have been proposed recently. The digital VTR converts analog image signals into digital image signals and records the digital image signals on a magnetic tape. The digital recorder records digital image signals on a disc type recording medium such as a solid state disk and a magneto-optical disc or a solid state memory such as a flash memory and an SRAM.

These apparatuses reduce an information amount by compressing digital image signals so that a large amount of moving or still image information can be stored in a small storage capacity. Moving image recording systems of various kinds have been proposed which compress moving image signals by utilizing a combination of various compression techniques to reduce the data amount and store the compressed data in a solid state memory, a magneto-optical disc or the like.

A moving image compressing and recording method is mainly divided into two methods depending upon a recording medium for storing moving image data.

One method sequentially records moving image data on a magnetic tape or the like. This method is, however, associated with the difficulty of searching a desired scene or changing the order of scenes.

The other method records each moving image scene on a medium capable of random access such as a solid state memory and a magneto-optical disc. With this method, since the medium is capable of random access, scene read/write can be performed starting at any address. It is therefore easy to directly search and reproduce a desired moving image scene or change the order of scenes.

In order to directly search a desired scene, as shown in FIG. 6A a digital still camera or the like for recording still image signals generally produces beforehand still image thumbnail images (representative images) by reducing the size of main images and displays a list of thumbnail images on the screen. Since the main image of the digital still camera is a still image, the characteristics of a main image can be seen from one reduced thumbnail image.

In contrast, since the main image of a video camera dealing with moving images is a moving image, the first frame of each scene is extracted from main images of moving images to produce thumbnail still images as shown in FIG. 6B. An approach has been proposed which forms thumbnail images functioning as search indices, as moving images as shown in FIG. 6C.

If moving images which is main images are subjected to effect processes (particularly fade-in effect, wipe-in effect, cross fading effect and the like), a thumbnail image produced from the start frame, which is subjected to the effect process, does not show well the characteristics of the main moving image.

If moving image data containing a large amount of data subjected to the effect process is used for creating a moving image thumbnail image, this thumbnail image does not show well the characteristics of the main moving image.

SUMMARY OF THE INVENTION

It is an object of the invention to solve the above-described problems.

It is another object of the invention to produce a thumbnail image showing well the characteristic of a moving image even if the moving image was subjected to an effect process.

In order to solve the above-described problems, the invention provides a recording apparatus comprising: effect means for subjecting a moving image signal to an effect process; recording means for recording a moving image signal subjected to the effect process by the effect means, on a recording medium; and representative image producing means for producing a representative image signal of the moving image signal recorded by the recording means, by using a portion of the moving image signal not subjected to the effect process by the effect means.

Other features and advantages of the present invention will become apparent from the following detailed description of embodiments of the invention taken in conjunction with the accompanying drawings.

DETAILED DESCRIPTION OF THE PREFERRED EMBODIMENTS

Embodiments of the invention will be described in detail with reference to the accompanying drawings.

In this embodiment, "one cut" means a series of moving image scenes recorded from the photographing start upon depression of a photographing button to the photographing end upon second depression of the photographing button. In the embodiments, moving image data is constituted of 30 frames per second. The number of frames per second may be larger or smaller than 30 frames. Interlace moving image data of 60 fields per second may be used. Also in this case, the number of fields may be larger or smaller than 60 fields.

First Embodiment

Figure 1:
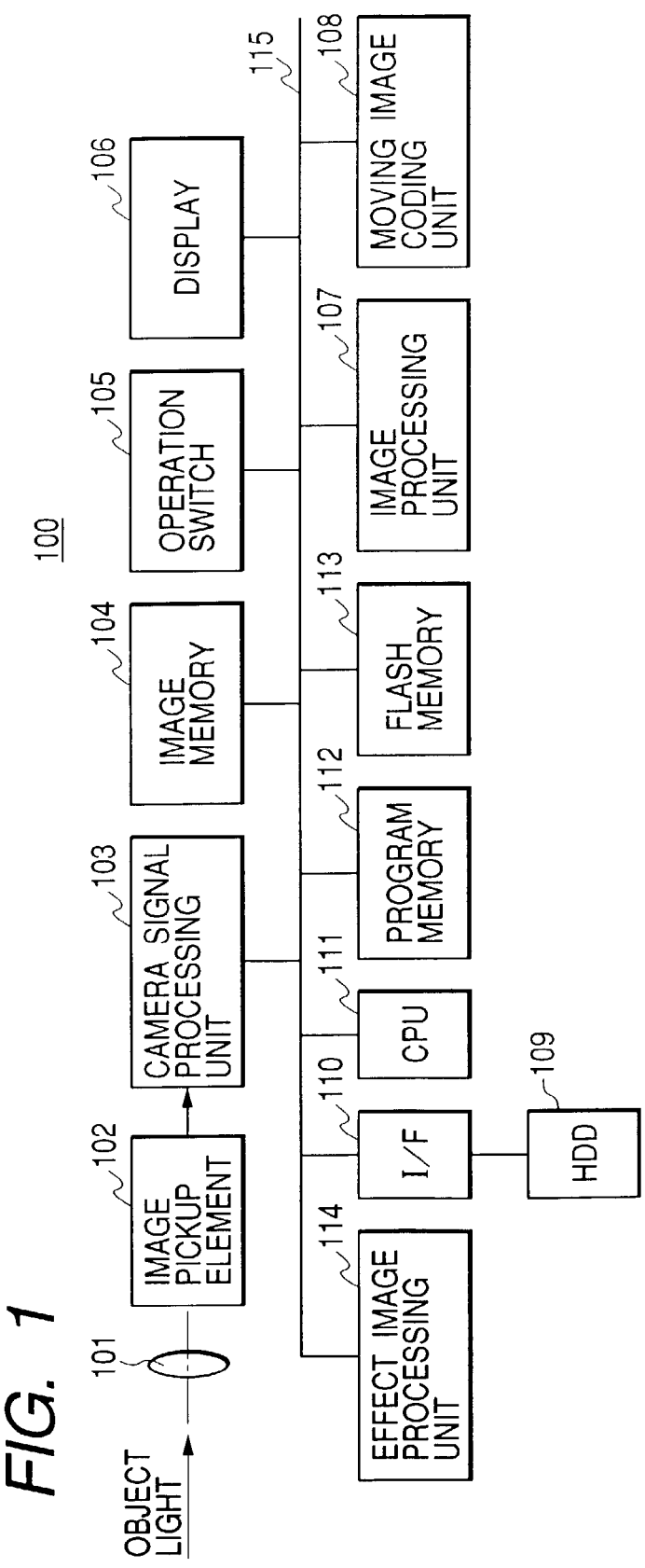
FIG. 1 is a schematic diagram showing the structure of a recording apparatus according to a first embodiment of the invention.

FIG. 1 is a diagram showing the structure of a video camera 100 to which the invention is applied.

When the power of the video camera 100 shown in FIG. 1 is turned on by activating an operation switch 105, a compressed program stored in a flash memory 113 is expanded and developed into a program memory 112. A CPU 111 operates in accordance with the program stored in the program memory 112 to perform various control operations to be described below.

Light from an object is focussed via a lens 101 onto an image pickup element 102. The image pickup element 102 converts a focussed object image into electric image signals. The electric image signals generated by the image pickup element 102 are read out at a predetermined period and processed by a camera signal processing unit 103 to be converted into standard digital image signals. The digital image signals are temporarily stored in an image memory 104 at a predetermined period.

The digital image data temporarily stored in the image memory 104 is sequentially sent to a display 106 to display a moving image currently picked up.

In case that a special effect process such as fading is to be performed, the image data temporarily stored in the image memory 104 is sent to an effect image processing unit 114 whereat a designated effect process is performed and the processed image data is again written back into the image memory 104. Thereafter, the processed image data is sequentially output from the image memory 104 to the display 106 to display a moving image subjected to the effect process.

If a user activates the operation switch 105 during a record pose state, an effect process to be performed on moving image data during a record state can be selected from a plurality of effect processes, or whether an effect process is performed or not can also be decided through activation of the operation switch by the user.

When a user activates a photographing button included in the operation switch 105, photographing starts.

Upon instruction of a photographing start, CPU 111 checks whether an effect process is set or not. If not, moving image data (main moving image data) temporarily stored in the image memory 104 is directly output to a moving image coding unit 108. If an effect process is set, the main moving image data stored in the image memory 104 is output to the effect image processing unit 114 whereat the main moving image data is subjected to the designated effect process. The moving image data subjected to the effect process is output to the moving image coding unit 108.

The moving image coding unit 108 compression encodes the supplied moving image data by using known coding techniques to generate compressed main moving image data which is temporarily stored in the image memory 104. An I/F 110 reads out the compressed moving image data temporarily stored in the image memory 104 at predetermined timings and in the unit of predetermined amount, and stores the compressed moving image data on a hard disc (HDD) 109.

Next, description will be made on a process of creating a thumbnail image in a moving image photographing mode.

Figure 3:
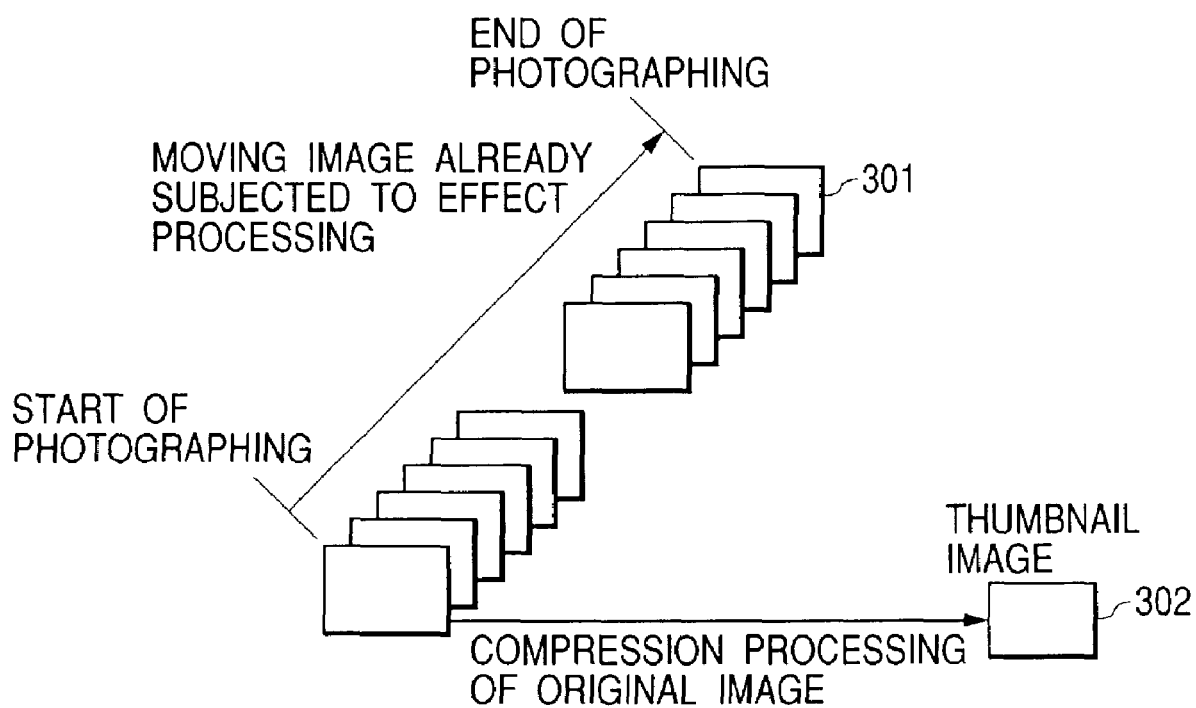
FIG. 3 is a diagram illustrating the operation of the recording apparatus according to the first embodiment.

FIG. 3 illustrates the process of creating a thumbnail image in a moving image photographing mode.

In this embodiment, a start frame of moving image data 301 to be recorded is extracted and a thumbnail image 302 is produced by using the extracted image data of one frame.

Even in case that an image of a start frame of moving image data subjected to an effect process such as fade-in is a white, the present embodiment reads out image data of the start frame before being subjected to the effect process by the effect image processing unit 114, from the image memory 104 to send to an image processing unit 107. The image processing unit 107 reduces the size of the image data of the start frame before being subjected to the effect process and stores it as thumbnail image data in a storage area different from that of the moving image data in the image memory 104. In this case, the image processing unit 107 adds addition information to the thumbnail image data and stores it in the image memory 104. The addition information indicates that the thumbnail image corresponds to the moving image data subjected to the effect process.

As the photographing button included in the operation switch 105 is again activated, recording is terminated. Upon instruction of this recording termination, CPU 111 instructs I/F 110 to stop recording moving image data, and outputs thumbnail image data stored in the image memory 104 to the moving image coding unit 108. The moving image coding unit 107 compression-encodes the thumbnail image data with a JPEG scheme and writes it as the compressed thumbnail image data again into the image memory 104. CPU 111 controls I/F 110 to read out the compressed thumbnail image data together with the addition information from the image memory 104 and writes it onto the hard disc (HDD) 109.

Figure 2:
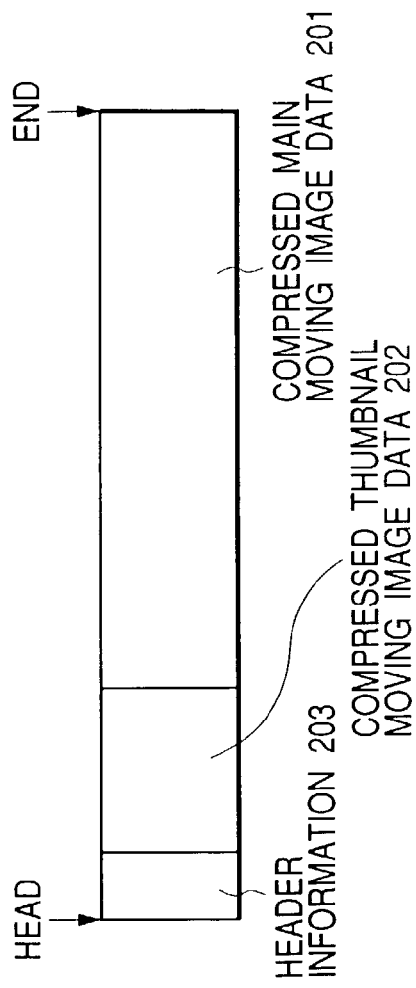
FIG. 2 shows the structure of a moving image file.

FIG. 2 is a diagram showing the structure of a moving image file recorded on the hard disc (HDD) 109 according to the embodiment. Upon reception of a recording termination instruction of moving image data of one cut, CPU 111 produces header information 203 including various informations such as the name and size of a moving image file and sends it to I/F 110. As shown in FIG. 1, CPU produces a moving image file by using the header information 203, compressed thumbnail image data 202 and compressed main moving image data 201 and records the file on the hard disc (HDD) 109.

Next, the reproducing process will be described.

When a reproduction mode is set by using the operation switch 105, CPU 111 controls I/F 110 to read out thumbnail image data from a moving image file recorded on the hard disc (HDD) 109 and writes it into the image memory 104.

Figure 4A:
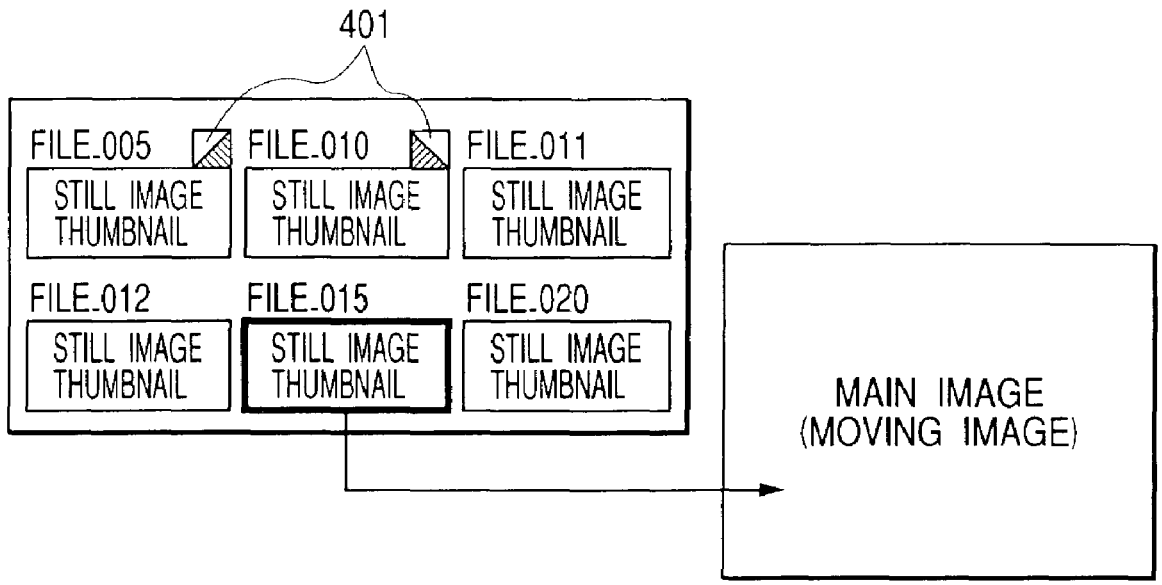
FIGS. 4A and 4B show index screens according to the first embodiment.

Then, compressed thumbnail image data is read out from the image memory 104 to be decoded by the moving image coding unit 115 and again written in the image memory 104. An index screen shown in FIG. 4A is produced and displayed on the display 106. In this case, CPU 111 detects the addition information added to the compressed thumbnail image data. If the addition information is detected, this means that the thumbnail image data corresponds to the moving image data subjected to the effect process. Therefore, as shown in FIG. 4A, an icon 401 indicating this effect is added to the thumbnail image.

A user selects a thumbnail image corresponding to the desired moving image data from displayed thumbnail images to thereby instruct the reproduction. CPU 111 controls I/F 110 to read out the moving image file corresponding to the designated thumbnail image from the hard disc (HDD) 109 and sends it via the image memory 104 to the moving image coding unit 108. The moving image coding unit 108 decodes the read-out moving image data and writes it in the image memory 104. The moving image data is read out from the image memory 104 and outputted to the display 106 to display the reproduced moving image on the display 106 in place of the index screen shown in FIG. 4A.

As described above, according to the embodiment, even in the case where moving image data is recorded after it is subjected to an effect process, a thumbnail image is formed by using image data extracted from the moving image data before it is subjected to the effect process. A thumbnail image showing well the characteristics of a corresponding main moving image can therefore be produced.

When a list of thumbnail images is displayed during reproduction, the icon 401 is displayed indicating that the thumbnail image corresponds to the moving image data subjected to an effect process. It is therefore easy to confirm that the corresponding moving image data was subjected to the effect process.

In this embodiment, even in the case that moving image data is recorded after it is subjected to the effect process, thumbnail image data is produced by using image data of a start frame of the moving image data before it is subjected to the effect process. The type of a designated effect process may be detected. In this case, if the detected effect process does not degrade so much the characteristics of an image, such as a sepia process different from a wipe process, a fading process or the like, a start frame is extracted from the moving image data subjected to the effect process and thumbnail image data is produced by reducing the size of the image data subjected to the effect process.

The moving image coding scheme of the moving image coding unit 24 shown in FIG. 1 may be a moving image coding scheme such as motion JPEG for compression-coding each frame independently, or a moving image coding scheme such as MPEG for compression-coding a specific frame independently, compression-coding by obtaining a difference between two successive frames, or compression-coding through prediction by using a plurality of frames.

Instead of the hard disc 109, a memory capable of random access may be used including a disk medium such as an optical disc and a magneto-optical disc and a semiconductor memory such as a flash memory, an SRAM and a DRAM.

Second Embodiment

In the second embodiment, the thumbnail image producing process of the first embodiment is applied to a moving image thumbnail. Also in this embodiment, description will be given by referring to the video camera shown in FIG. 1. Processes other than the thumbnail image producing process and the reproduction process are the same as those of the first embodiment, and so the description thereof is omitted.

Description will be given on the thumbnail image producing process of the second embodiment.

Figure 5:
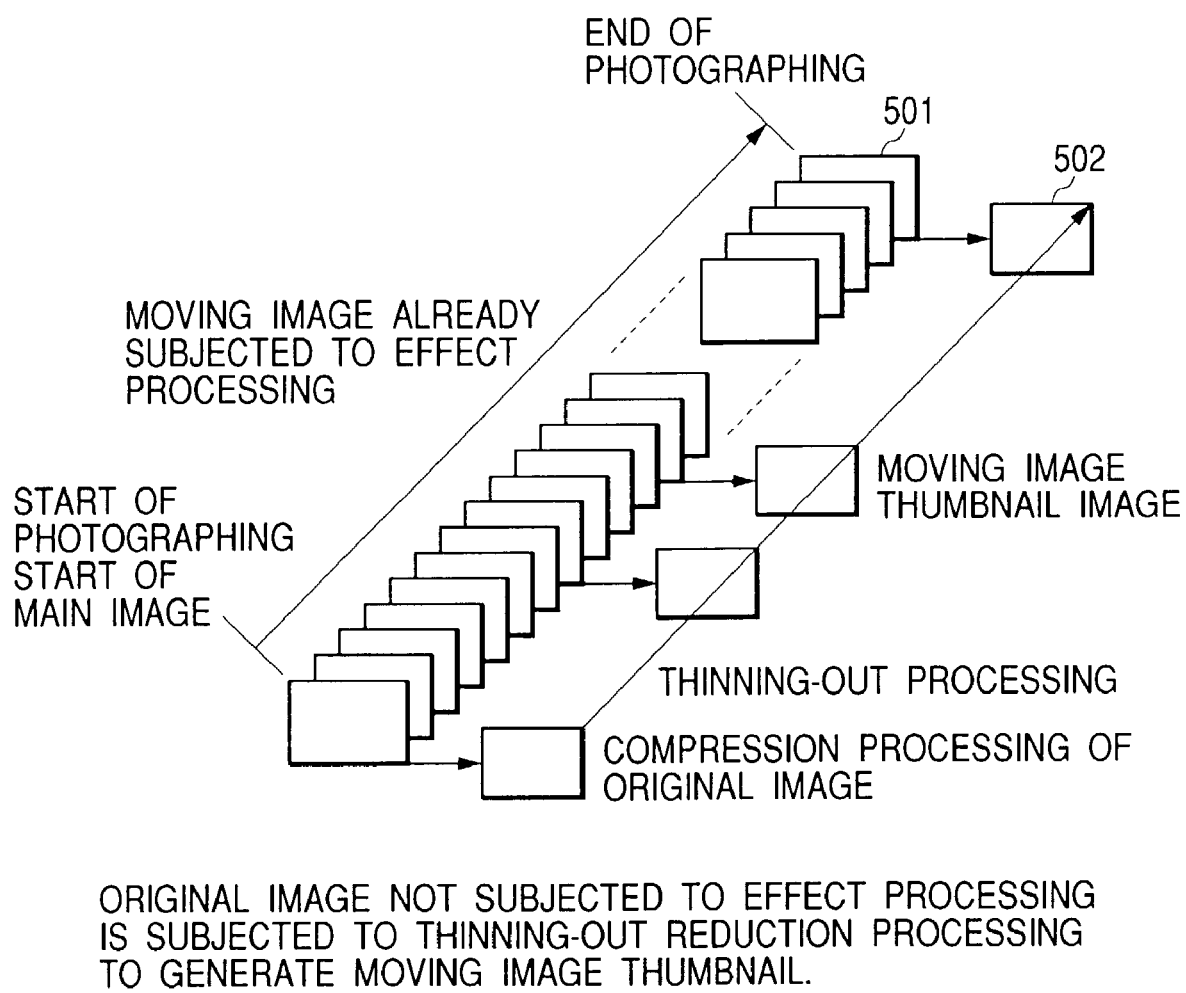
FIG. 5 is a diagram illustrating the operation of a recording apparatus according to a second embodiment.
Figure 6A:
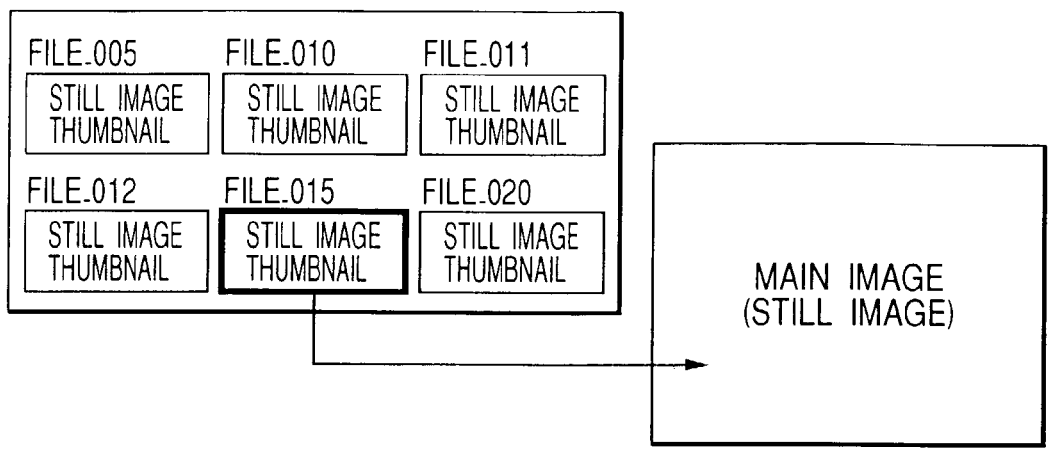
FIGS. 6A, 6B and 6C are diagrams showing examples of conventional index screens.
Figure 6B:
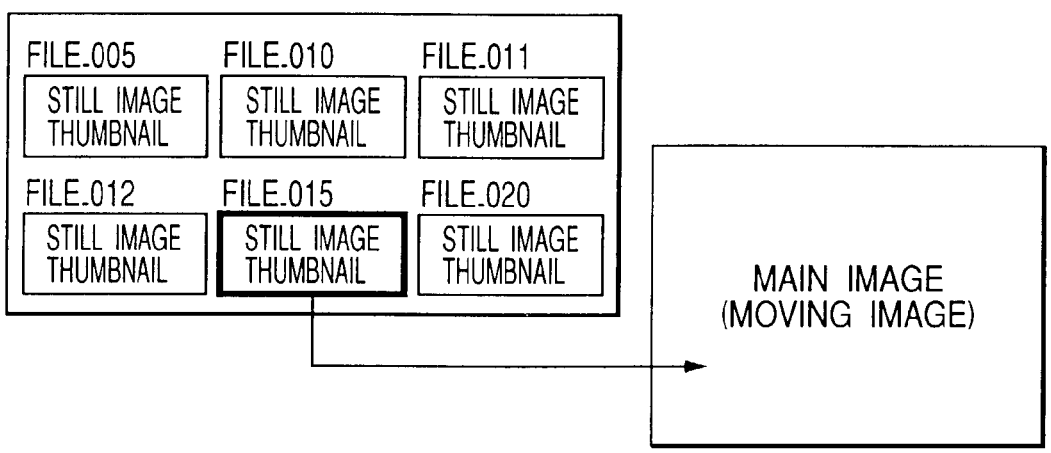
Figure 6C:
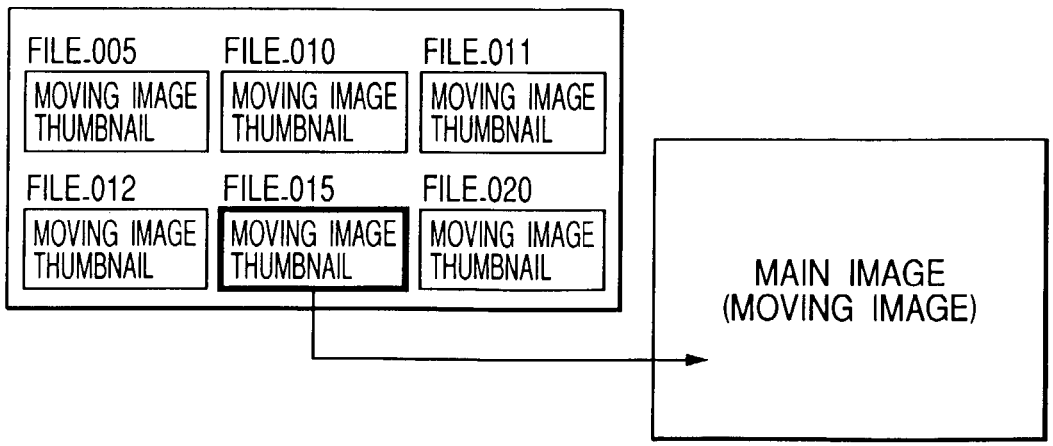

FIG. 5 illustrates the process of producing a moving image thumbnail.

As shown in FIG. 5, upon reception of a recording start instruction, CPU 111 extracts image data of a start frame and image data of some frames at predetermined timings from the main moving image data 501 before the image data is subjected to the effect process, in parallel to the recording operation of the main moving image data, and sequentially outputs the extracted image data to the image processing unit 107. The image processing unit 107 reduces the size of image data extracted in the above manner and stores it in the image memory 104. Moving image thumbnails 502 are produced by thinning out the moving image data in the above manner.

After the recording termination, the reduced moving image thumbnail data is read out from the image memory 104 and encoded by the moving image coding unit 108 to produce compressed moving image thumbnail data and again write it into the image memory 104. The moving image thumbnail data together with the addition information indicative of the effect process is recorded on the hard disc (HDD) 109 in the format shown in FIG. 2.

Figure 4B:
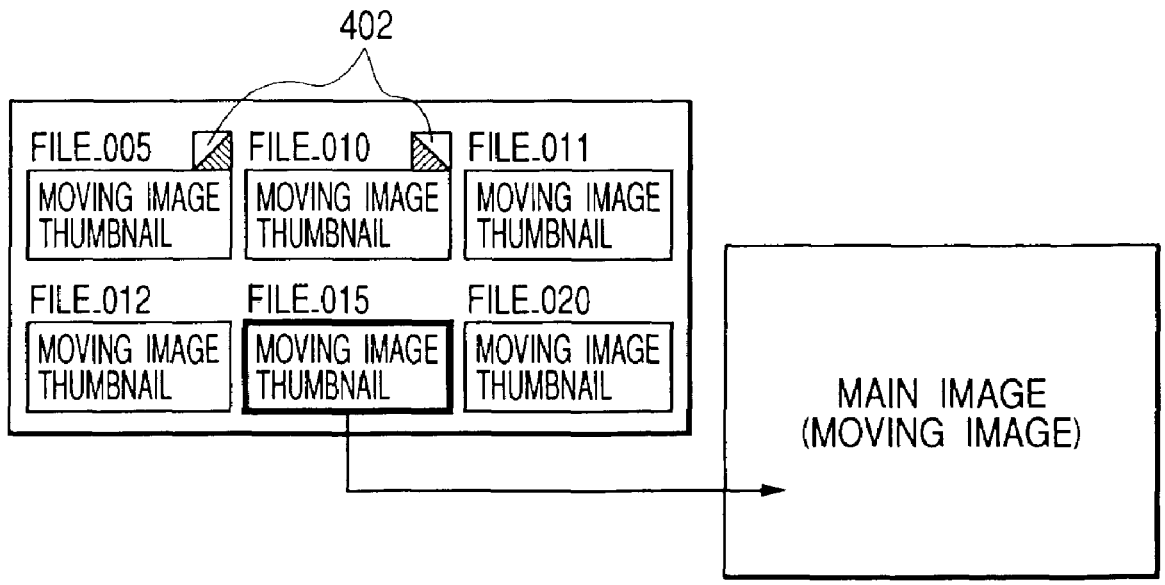

FIG. 4B shows an index display screen for the reproduction of the moving image files recorded in the above manner. As shown in FIG. 4B, in this embodiment, a list of moving image thumbnails is displayed, and if the corresponding main moving image data was subjected to the effect process, an icon 402 indicating such effect is added and displayed.

As described above, according to the embodiment, even in the case that moving image data is recorded after it is subjected to an effect process, a moving image thumbnail is formed by using thinned-out main moving image data before it is subjected to the effect process. A moving image thumbnail showing well the characteristics of a corresponding main moving image can therefore be produced.

For the thinning-out process used when moving image thumbnails are produced, the moving image thumbnails may be produced by thinning out the moving image data at a constant interval or by changing the thinning-out interval in accordance with the lapse time from the recording start.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus comprising:
an imaging unit;
an effect process unit configured to subject moving image data obtained by the imaging unit to an effect process, the effect process unit subjecting a predetermined frame of the moving image data to the effect process;
a recording unit configured to record moving image data on a recording medium in response to an instruction for a recording start of the moving image data; and
a representative image producing unit configured to produce a representative image data of the moving image data subjected to the effect process by the effect process unit and recorded by the recording unit, by using the predetermined frame of the moving image data which is not subjected to the effect process by the effect process unit prior to the effect process being performed on the moving image data by the effect process unit, in response to the instruction for the recording start of the moving image data,
wherein the effect process unit subjects the predetermined frame of the moving image data obtained by the imaging unit to the effect process and the recording unit records the moving image data including the predetermined frame subjected to the effect process by the effect process unit on the recording medium and records the representative image data produced by the representative image producing unit on the recording medium as the representative image of the moving image data subjected to the effect process by the effect process unit and recorded by the recording unit.

2. An apparatus according to claim 1, wherein the representative image producing unit extracts the predetermined frame from the moving image data prior to the effect process being performed on the moving image data by the effect process unit.

3. An apparatus according to claim 2, wherein the representative image producing unit extracts, as the predetermined frame, a recording start frame by the recording unit from the moving image data prior to the effect process being performed on the moving image data by the effect process unit.

4. An apparatus according to claim 2, wherein the recording unit records the moving image data and the corresponding representative image data as a same file.

5. An apparatus according to claim 1, further comprising:
a reproducing unit configured to reproduce the moving image data and the representative image data from the recording medium; and
a display unit configured to display the representative image of the moving image data reproduced by the reproducing unit with an icon indicating the effect process.

6. An apparatus according to claim 1, wherein the effect process includes at least one of a fade process and a wipe process.

7. An apparatus according to claim 1, further comprising:
a display unit configured to display the moving image represented by the moving image data subjected to the effect process according to the instruction for the recording start of the moving image data.

8. An imaging apparatus comprising:
an imaging unit;
an effect process unit configured to subject moving image data obtained by the imaging unit to an effect process;
a representative image producing unit configured to select one frame of the moving image data which is not subjected to the effect process by the effect process unit prior to the effect process being performed on the moving image data by the effect process unit and to produce a representative image data of the moving image data subjected to the effect process by the effect process unit by using the selected one frame of the moving image data, in response to an instruction for a recording start of the moving image data; and
a recording unit configured to record the moving image data subjected to the effect process by the effect process unit and the representative image data produced by the representative image producing unit on a recording medium in response to the instruction for the recording start of the moving image data.

9. An imaging apparatus comprising:
an imaging unit;
a memory that stores the moving image data obtained by the imaging unit;
an effect process unit configured to read the moving image data stored in the memory and subject the moving image data read from the memory to an effect process, the effect process unit subjecting a predetermined frame of the moving image data to the effect process;
a recording unit configured to record moving image data on a recording medium in response to an instruction for a recording start of the moving image data; and
a representative image producing unit configured to read the moving image data stored in the memory and produce a representative image data of the moving image data subjected to the effect process by the effect process unit and recorded by the recording unit, by using the predetermined frame of the moving image data which is not subjected to the effect process by the effect process unit prior to the effect process being performed on the moving image data by the effect process unit, in response to the instruction for the recording start of the input moving image data,
wherein the effect process unit subjects the predetermined frame of the moving image data to the effect process and the recording unit records the moving image data including the predetermined frame subjected to the effect process by the effect process unit on the recording medium and records the representative image data produced by the representative image producing unit on the recording medium as the representative image of the moving image data subjected to the effect process by the effect process unit and recorded by the recording unit.

10. An imaging apparatus comprising:
an imaging unit;
an effect process unit configured to subject moving image data obtained by the imaging unit to an effect process, the effect process unit subjecting a predetermined frame of the moving image data to the effect process;
a recording unit configured to record moving image data on a recording medium in response to an instruction for a recording start of the moving image data; and
a representative image producing unit configured to produce a representative image data of the moving image data recorded on the recording medium by using the predetermined frame of the moving image data;
a mode setting unit configured to set a mode of the apparatus to one of a plurality of modes including a first mode in which the recording unit records the moving image data subjected to the effect process by the effect process unit and the representative image producing unit produces the representative image data of the moving image data subjected to the effect process by the effect process unit and recorded on the recording medium by the recording unit, and a second mode in which the recording unit records the moving image data which is not subjected to the effect process by the effect process unit and the representative image producing unit produces the representative image data of the moving image data recorded on the recording medium by the recording unit,
wherein the representative image producing unit produces, in the first mode, the representative image data of the moving image data subjected to the effect process by the effect process unit and recorded by the recording unit, by using the predetermined frame of the moving image data which is not subjected to the effect process by the effect process unit prior to the effect process being performed on the moving image data by the effect process unit, in response to the instruction for the recording start of the moving image data.

* * * * *